United States Patent
Usuki et al.

(10) Patent No.: US 6,825,288 B2
(45) Date of Patent: Nov. 30, 2004

(54) METHOD OF PRODUCING OF VINYL CHLORIDE-BASED POLYMER

(75) Inventors: Masahiro Usuki, Kashima-gun (JP); Toyotaro Kuniyasu, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/370,744

(22) Filed: Feb. 24, 2003

(65) Prior Publication Data

US 2003/0162927 A1 Aug. 28, 2003

(30) Foreign Application Priority Data

Feb. 26, 2002 (JP) ........................... 2002-050577

(51) Int. Cl.$^7$ ............................. C08F 2/18; C08F 14/06
(52) U.S. Cl. ........................ 526/68; 526/67; 526/344; 526/344.2; 526/345
(58) Field of Search .............................. 526/67, 68, 88, 526/344, 344.2, 345

(56) References Cited

U.S. PATENT DOCUMENTS

| | | |
|---|---|---|
| 4,056,667 A | 11/1977 | Sonnenberg et al. |
| 4,455,413 A | 6/1984 | Tomishima et al. |
| 4,555,555 A | 11/1985 | Toyooka et al. |
| 4,752,640 A * | 6/1988 | Tomishima et al. ........... 526/61 |
| 4,771,114 A | 9/1988 | Kobayashi et al. |
| 4,849,482 A | 7/1989 | Kobayashi et al. |
| 5,087,678 A | 2/1992 | Noguki et al. |
| 5,587,437 A * | 12/1996 | Adachi et al. ................ 526/68 |
| 5,807,934 A | 9/1998 | Takahashi et al. |

FOREIGN PATENT DOCUMENTS

| | | |
|---|---|---|
| EP | 0 661 093 | 7/1995 |
| GB | 1215741 | 3/1968 |
| JP | 57-8206 | 1/1982 |
| JP | 7-25909 | 1/1995 |

* cited by examiner

*Primary Examiner*—Fred Teskin
(74) *Attorney, Agent, or Firm*—Oblon, Spivak, McClelland, Maier & Neustadt, P.C.

(57) ABSTRACT

A method of producing a vinyl chloride-based polymer by suspension polymerization is provided, by which heat removal performed by a reflux condenser can be increased, but total heat removal performed by the jacket can be reduced, without affecting the quality of the product polymer. The method includes commencing heat removal when or after a polymerization conversion rate reaches 15%, and controlling said reflux condenser so as to remove a fixed quantity of heat per unit of time depending on the polymerization conversion rate as the polymerization process proceeds.

11 Claims, No Drawings

METHOD OF PRODUCING OF VINYL CHLORIDE-BASED POLYMER

BACKGROUND OF THE INVENTION

1. Field of the Invention

The present invention relates to a method of producing a vinyl chloride-based polymer using suspension polymerization, in which the heat removal efficiency can be improved without affecting the quality of the product polymer.

2. Description of the Prior Art

In the production of vinyl chloride-based polymers, large scale polymerization vessels and reduced polymerization times are used to improve the productivity. In one technique, a method is employed in which heat removal is performed using both a polymerization vessel jacket and a reflux condenser, in order to increase the reaction heat removal capability per unit of time. Particularly in cases in which the maximum value of the total heat removed per unit of time exceeds 10,000 MJ/hr, it is typical for a coolant which has been cooled using a cooling apparatus such as a refrigeration device to be used as a cooling medium and passed through the polymerization vessel jacket, and for a reflux condenser to also be used. In these types of methods requiring the use of a coolant, from an economic viewpoint it is desirable to reduce the proportion of heat removal performed by the jacket, in order to economize on the power costs associated with operating the refrigeration device. As a result, it is necessary to increase the proportion of heat removal performed by the condenser, without requiring the use of the coolant cooled by the refrigeration device.

However, in those cases in which a vinyl chloride-based polymer is produced by a suspension polymerization method using a dispersant (such as a partially saponified polyvinyl alcohol, or a cellulose ether), if heat removal is conducted so that the proportion of the total heat removal performed by the reflux condenser per unit of time exceeds 30%, then not only are the particle size distribution, the bulk specific gravity and the porosity of the product polymer all affected, but foaming of the polymerization reaction liquid increases during the polymerization, and in some cases the polymerization reaction liquid may erupt up into the reflux condenser causing particles of polymer to become deposited on the inside of the condenser, and these particles may then fall back into the polymerization reaction liquid, causing an increase in fish eyes and defects within the molded polymer film. Accordingly, in order to prevent these types of problems, the quantity of heat removed by the reflux condenser per unit of time during the polymerization reaction is typically restricted to less than 30% of the total quantity of heat removed.

SUMMARY OF THE INVENTION

An object of the present invention is to provide a method of producing a vinyl chloride-based polymer by suspension polymerization using a polymerization vessel equipped with both a reflux condenser and a jacket, wherein the proportion of the total heat removal performed by the reflux condenser per unit of time can be increased, and the proportion of the total heat removal performed by the jacket can be reduced, without affecting the quality of the product polymer.

The present invention provides a method of producing a vinyl chloride-based polymer by suspension polymerization of vinyl chloride or a monomer mixture comprised of vinyl chloride using a polymerization vessel equipped with a reflux condenser and a jacket, in which a maximum value of total quantity of heat removed per unit of time is at least 10,000 MJ/hr, said method comprising:

(1) commencing heat removal when or after a polymerization conversion rate reaches 15%, (2) controlling said reflux condenser so as to remove a fixed quantity of heat per unit of time during a period from a point where said polymerization conversion rate reaches a preset polymerization conversion rate within a range from 20 to 35%, until a point where said polymerization conversion rate reaches another preset polymerization conversion rate within a range from 50 to 65%, wherein a ratio of a quantity of heat removed by said reflux condenser (A MJ/hr) relative to a total quantity of heat removed, per unit of time, is within a range from 30 to 60%, (3) controlling said reflux condenser so as to remove a fixed quantity of heat per unit of time during a period from a point where said polymerization conversion rate reaches a preset polymerization conversion rate within a range from 70 to 75%, until a point where said polymerization conversion rate reaches another preset polymerization conversion rate of at least 80%, wherein a ratio of a quantity of heat removed by said reflux condenser (B MJ/hr) relative to a total quantity of heat removed, per unit of time, is within a range from 20 to 30%, wherein a ratio of said quantity of heat removed (A MJ/hr)/said quantity of heat removed (B MJ/hr) is in a range from 1.2 to 2.0.

DETAILED DESCRIPTION OF THE PREFERRED EMBODIMENTS

As follows is a more detailed description of the present invention.

<Heat Removal Pattern Using a Reflux Condenser>

As a result of intensive investigations, the inventors of the present invention discovered that when a polymerization reaction is conducted using a reflux condenser, during the period when the polymerization conversion rate is between 20 and 65%, even if the quantity of heat removed by the reflux condenser per unit of time (under a fixed rate operation) exceeds 30% of the total heat generated by the polymerization per unit of time, little foaming occurs in the polymerization reaction liquid, and effects on the quality of the polymer such as the bulk specific gravity, the porosity and the occurrence of fish eyes are minimal.

In other words, in a reflux condenser heat removal pattern according to the present invention, heat removal using the reflux condenser is commenced at or after the point where the polymerization conversion rate reaches 15%, and then fixed rate heat removal operation of the reflux condenser is performed over two subsequent stages, during a preset range (a first stage) when the polymerization conversion rate is between 20 and 65%, and during a preset range (a second stage) when the polymerization conversion rate exceeds 70% (and is preferably between 70 and 90%), and by setting the quantity of heat removed by the reflux condenser during the first stage of the heat removal pattern to a larger value than that of the second stage, the quantity of coolant required for the heat removal performed by the polymerization vessel jacket can be reduced, thereby conserving energy by reducing the operational load on the refrigeration device, while the quality of the product vinyl chloride-based polymer remains unaffected.

The polymerization vessel used in the present invention is a jacketed vessel with a reflux condenser attached either directly or indirectly at the top of the vessel. There are no particular restrictions on the structure of the polymerization vessel jacket, and known systems can be used. Furthermore, in the case of a large scale polymerization vessel, the vessel may also include a cooling baffle or a cooling coil or the like inside the vessel in order to increase the area of heat removal surfaces. A stirrer is provided either through the upper portion of the vessel or in the base of the vessel.

In a heat removal pattern of the present invention, initial commencement of heat removal using the reflux condenser must occur when or after the polymerization conversion rate has reached 15%. If heat removal is commenced before the polymerization conversion rate has reached this level, then heat removal starts at a stage in which the apparent particle size distribution is yet to be determined, and consequently the quantity of refluxing monomers is large, and the distribution within the suspension system becomes very non-uniform, making control of the particle size distribution of the product polymer very difficult. In addition, dispersion of the catalyst also becomes non-uniform, resulting in an unfavorable increase in the occurrence of fish eyes.

Furthermore, if the heat removal quantity is raised instantaneously from the commencement of heat removal to the fixed rate of the aforementioned first stage, then a large amount of foaming occurs very rapidly, resulting in fish eyes and other defects, and consequently a fixed period of time is provided prior to commencing the fixed rate heat removal operation of the reflux condenser of the first stage, and during this fixed period, the heat removal quantity is preferably raised gradually until it reaches the fixed rate of the first stage.

In the present invention, during the fixed rate heat removal operation of the first stage, the ratio of the quantity of heat removed by the reflux condenser relative to the total quantity of heat removed per unit of time must be controlled within a range from 30 to 60%. If this heat removal ratio is less than 30%, then the effects of the present invention in reducing the quantity of coolant required for the heat removal performed by the polymerization vessel jacket, and reducing the operational load on the refrigeration device cannot be achieved. In contrast, if the heat removal ratio exceeds 60%, then as described above in relation to the conventional technology, problems arise in terms of the quality of the product polymer, including an increase in the occurrence of fish eyes in the molded film arising from foaming within the polymerization liquid.

On the other hand, during the fixed rate heat removal operation of the second stage, the ratio of the quantity of heat removed by the reflux condenser relative to the total quantity of heat removed per unit of time must be controlled within a range from 20 to 30%. If this heat removal ratio exceeds 30%, then in this second stage reflux condenser heat removal stage, during the latter stages of the polymerization, namely at polymerization conversion rates of at least 70% (and preferably for polymerization conversion rates from 70 to 90%), volumetric shrinkage accompanying the progress of the reaction causes a lowering of the reaction liquid level, leading to an increase in the apparent slurry concentration, that is, an increase in viscosity, and consequently eruptions from the slurry are more likely. As a result, the ratio during this stage must be maintained at no more than 30%, as in the conventional technology. In contrast if the heat removal ratio falls below 20%, then the effect of improving the heat removal efficiency using the reflux condenser is weakened.

Furthermore in the present invention, if the quantity of heat removed by the reflux condenser per unit of time during the first stage fixed rate heat removal operation is termed A MJ/hr, and the quantity of heat removed by the reflux condenser per unit of time during the second stage fixed rate heat removal operation is termed B MJ/hr, then the ratio A/B must be within a range from 1.2 to 2.0. If the quantity of heat removed by the reflux condenser during the first stage is less than 1.2 fold the quantity of heat removed during the second stage, then only a small energy conservation effect is achieved as a result of the reduction in the operational load on the refrigeration device arising from having increased the heat removal quantity performed by the reflux condenser to a higher value than conventional technology. On the other hand, if the above ratio exceeds 2.0, then quality control of factors such as the particle size distribution within the product polymer becomes difficult. By setting the heat removal ratio for the first and second stages as described above, then for example in the case in which the polymerization time is shortened for a polymerization conducted in a large scale polymerization vessel exceeding 100 m$^3$, the energy conservation effect described above is marked.

Furthermore, during the heat removal of the first stage of a heat removal pattern according to the present invention, a heat removal control method using a liquid level gauge as disclosed in Japanese Laid-open Patent publication (kokai) No. 7-25909 (JP7-25909A), or conventional antifoaming agents may also be used. In addition, if necessary, a method in which a mixed gas of the vinyl chloride monomer and an inert gas such as nitrogen gas or carbon dioxide is discharged externally (inert purge) may also be performed concurrently.

<Heat Removal From the Polymerization Vessel>

Prior to introducing the raw materials for the polymerization into the polymerization vessel, and during the supply of these raw materials, the jacket and the baffle are held at room temperature, and the reflux condenser is held at a temperature of at least 70° C., and preferably at a temperature within a range from 70 to 90° C. Following completion of the introduction of the polymerization raw materials into the polymerization vessel, hot water is passed through the jacket and the baffle, and the temperature of the reactant mixture is raised. When the temperature of the reactant mixture has reached at the set polymerization temperature, cold water is passed through the jacket and the baffle, and the temperature of the reactant mixture is maintained at the set polymerization temperature while the polymerization reaction proceeds.

When or after the polymerization conversion rate reaches 15%, cold water is passed through the reflux condenser, and heat removal using the reflux condenser is commenced. Once heat removal using the reflux condenser has commenced, the quantity of heat removed by the reflux condenser is gradually increased, and when the quantity of heat removed by the reflux condenser per unit of time reaches a preset value at a polymerization conversion rate within a range from 20 to 35%, fixed rate heat removal operation of the reflux condenser is commenced, and is continued until the polymerization conversion rate reaches a value within a range from 50 to 65% (the first stage fixed rate heat removal operation).

During this fixed rate heat removal operation, the ratio of the quantity of heat removed by the reflux condenser (A MJ/hr) relative to the total quantity of heat removed per unit of time is within a range from 30 to 60%, and the heat removal operation is performed with the reaction mixture maintained at the set polymerization temperature.

After the first stage fixed rate heat removal operation is continued until the polymerization conversion rate reaches a value within a range from 50 to 65%, the quantity of heat removed by the reflux condenser is reduced, and when the quantity of heat removed by the reflux condenser per unit of time reaches a preset value, at a polymerization conversion rate within a range from 70 to 75%, fixed rate heat removal operation of the reflux condenser is recommenced, and is continued until the polymerization conversion rate reaches a value exceeding 80% (and preferably a value within a range from 80 to 90%) (the second stage fixed rate heat removal operation).

During this second fixed rate heat removal operation, the ratio of the quantity of heat removed by the reflux condenser (B MJ/hr) relative to the total quantity of heat removed per unit of time is within a range from 20 to 30%, and the heat removal operation is performed with the reaction mixture maintained at the set polymerization temperature.

The first stage fixed rate heat removal operation and the second stage fixed rate heat removal operation are conducted so that the ratio of the quantity of heat removed by the reflux condenser (A MJ/hr)/the quantity of heat removed by the reflux condenser (B MJ/hr)=1.2 to 2.0.

The polymerization conversion rate during the polymerization reaction is calculated according to the following formula.

Polymerization conversion rate (%) = total quantity of heat removed (kcal)/X

X = quantity of charged vinyl chloride (kg) × 368 (kcal/kg) + quantity of charged $C_0$(kg) × $C_1$(kcal/kg)

(wherein, $C_0$ represents a comonomer, and $C_1$ represents the reaction calorific value of the comonomer)

Total quantity of heat removed (kcal)={(total heat removed by jacket+baffle (kcal))+total heat removed by reflux condenser (kcal)}

The value of "total heat removed by jacket+baffle (kcal)" described above is determined every two minutes after the passage of coolant through the jacket and the baffle is commenced, by calculating the quantity of heat removed during the just completed two minute period using the formula below, and then determining the total sum of these two minute heat removal quantities.

2 minute heat removal quantity $(kcal) = R_{01}(kg/hr) \times (T_{02} - T_{01})° C. \times D\{kcal/(kg \cdot ° C.)\} \times (2 \text{ minutes}/60 \text{ minutes})$ (wherein in the above formula,
$R_{01}$: coolant flow rate through the jacket and the baffle (kg/hr)
$T_{02}$: exit temperature of coolant from the jacket and the baffle (° C.)
$T_{01}$: entry temperature of coolant to the jacket and the baffle (° C.)
D: specific heat of the coolant)

Furthermore, the value of "total heat removed by reflux condenser (kcal)" described above is also determined every two minutes in a similar manner to that described above, by calculating the quantity of heat removed during the just completed two minute period, and then determining the total sum of these two minute heat removal quantities.

2 minute heat removal quantity $(kcal) = R_{11} (kg/hr) \times (T_{12} - T_{11})° C. \times D\{kcal(kg \cdot ° C.)\} \times (2 \text{ minutes}/60 \text{ minutes})$ (wherein in the above formula,
$R_{11}$: coolant flow rate through the reflux condenser (kg/hr)
$T_{12}$: exit temperature of coolant from the reflux condenser (° C.)
$T_{11}$: entry temperature of coolant to the reflux condenser (° C.)
D: specific heat of the coolant)

<Monomer Raw Material>

The monomer raw material used in the present invention is either vinyl chloride or a monomer mixture comprising vinyl chloride as the primary constituent. A monomer mixture comprising vinyl chloride as the primary constituent comprises at least 50% by weight of vinyl chloride, as well as at least one other monomer which is copolymerizable with vinyl chloride. Examples of the other monomer which is copolymerizable with vinyl chloride include vinyl esters such as vinyl acetate and vinyl propionate; acrylate esters or methacrylate esters such as methyl acrylate and ethyl acrylate; olefins such as ethylene and propylene; as well as maleic anhydride, acrylonitrile, styrene and vinylidene chloride. These monomers may be used singularly, or in combinations of two or more monomers.

<Dispersant>

In a method of the present invention, for the case in which either vinyl chloride or a monomer mixture comprising vinyl chloride as the primary constituent undergoes suspension polymerization in an aqueous medium, there are no particular restrictions on the dispersant used, and the types of dispersants used in conventional vinyl chloride-based polymer production are suitable.

Specific examples of these types of dispersants include water soluble cellulose ether compounds such as methyl cellulose, hydroxyethyl cellulose, hydroxypropyl cellulose and hydroxypropylmethyl cellulose; partially saponified polyvinyl alcohols such as water soluble partially saponified polyvinyl alcohol; acrylic acid polymers; water soluble polymers such as gelatin; oil soluble emulsifiers such as sorbitan monolaurate, sorbitan trioleate, glycerin tristearate, and block copolymers of ethylene oxide and propylene oxide; and water soluble emulsifiers such as polyoxyethylene sorbitan monolaurate, polyoxyethylene glycerin oleate and sodium laurate. These dispersants may be used singularly, or in combinations of two or more different dispersants. In the example described above, water soluble cellulose ethers and partially saponified polyvinyl alcohols are particularly effective. The quantity of dispersant added is typically within a range from 0.02 to 1 part by weight per 100 parts by weight of the raw material monomer.

<Polymerization Initiator>

There are no particular restrictions on the polymerization initiator used in the method of the present invention, and the types of initiators used in conventional vinyl chloride-based polymer production are suitable.

Specific examples of suitable polymerization initiators include peroxycarbonate compounds such as diisopropyl peroxydicarbonate, di-2-ethylhexyl peroxydicarbonate and diethoxyethyl peroxydicarbonate; peroxy ester compounds such as t-butyl peroxypivalate, t-hexyl peroxypivalate, t-butyl peroxyneodecanoate and α-cumyl peroxyneodecanoate; peroxides such as acetyl cyclohexylsulfonyl peroxide, 2,4,4-trimethylpentyl-2-peroxyphenoxy acetate and 3,5,5-trimethylhexanoyl peroxide; azo compounds such as azobis-2,4-dimethylvaleronitrile and azobis(4-methoxy-2,4-dimethylvaleronitrile); as well as potassium persulfate, ammonium persulfate and hydrogen peroxide and the like. These polymerization initiators may be used singularly, or in combinations of two or more different initiators. The quantity of polymerization initiator added is typically within a range from 0.02 to 0.3 parts by weight per 100 parts by weight of the raw material monomer.

<Antioxidants>

There are no particular restrictions on the antioxidants used in the present invention, and the types of antioxidants typically used in conventional vinyl chloride-based polymer production are suitable.

Specific examples of suitable antioxidants include phenol compounds such as 2,2-di(4'-hydroxyphenyl)propane, hydroquinone, p-methoxyphenol, t-butylhydroxyanisol, n-octadecyl-3-(4-hydroxy-3,5-di-t-butylphenyl)propionate, t-butylhydroquinone, 2,5-di-t-butylhydroquinone, 4,4'-butylidenebis(3-metyl-6-t-butylphenol), 3,5-di-t-butyl-4-hydroxytoluene, 2,2'-methylene-bis(4-ethyl-6-t-butylphenol), triethylene glycol-bis[3-(3-t-butyl-5-methyl-4-hydroxyphenyl)propionate], pentaerythrityl-tetrakis[3-(3,5-di-t-butyl-4-hydroxyphenyl)propionate], 2,6-di-t-butyl-4-sec-butylphenol, 2,6-di-t-butyl-4-methylphenol, t-butylcatechol, 4,4'-thiobis(6-t-butyl-m-cresol), tocopherol and nordihydro-guaiaretic acid; semicarbazide derivatives such as semicarbazide, 1-acetylsemicarbazide, 1-chloroacetylsemicarbazide, 1-dichloroacetylsemicarbazide, 1-benzoylsemicarbazide and semicarbazone; thiocarbazide derivatives such as carbohydrazide, thiosemicarbazide and thiosemicarbazone; amine compounds such as phenylnaphthylamine, N,N'-diphenyl-p-phenylenediamine and 4,4'-bis(dimethylbenzyl) diphenylamine; nitro and nitroso compounds such as nitroanisol, N-nitrosodiphenylamine, nitroaniline and the aluminum salt of N-nitrosophenylhydroxylamine; phosphorus compounds such as triphenyl phosphite, diphenylisodecyl phosphite, phenyldiisodecyl phosphite, 4,4'-butylidenebis(3-methyl-6-t-butylphenyl-di-tridecyl) phosphite, cyclic isopentane tetraylbis(octadecyl phosphite), tris (nonylphenyl) phosphite and tris(dinonylphenyl) phosphite; unsaturated hydrocarbon compounds such as styrene, 1,3-hexadiene and methylstyrene; and sulfur compounds such as dilauryl thiodipropionate, dimyristyl thiodipropionate, distearyl thiodipropionate, dodecylmercaptan and 1,3-diphenyl-2-thiourea. These antioxidants can be used singularly, or in combinations of two or more compounds.

Of the above antioxidants, from the viewpoints of limiting initial coloration when the product polymer is molded into a film or the like, and limiting scale adhesion to the polymerization vessel, 3,5-di-t-butyl-4-hydroxytoluene, triethylene glycol-bis[3-(3-t-butyl-5-methyl-4-hydroxyphenyl)propionate], t-butylhydroxyanisol, t-butylhydroquinone, 2,6-di-t-butyl-4-sec-butylphenol and octadecyl-3-(3,5-di-t-butyl-4-hydroxyphenyl)propionate are preferred. The quantity of antioxidants added is typically within a range from 0.0001 to 0.1 parts by weight per 100 parts by weight of the raw material monomer.

<Other Conditions>

Other conditions associated with the polymerization, such as the method of supplying the aqueous medium, the vinyl chloride or the monomer mixture comprising vinyl chloride, the dispersant and the polymerization initiator and the like to the polymerization vessel, the relative proportions within the reaction mixture and the polymerization temperature may be similar to conventional methods.

Moreover in the method of the present invention, where necessary, other additives typically used in the production of vinyl chloride-based polymers such as polymerization degree regulators, chain transfer agents, antistatic agents, and scale adhesion prevention agents may also be added to the polymerization system. Furthermore, the antioxidant can be added to the polymerization system prior to commencement of the polymerization reaction, during the polymerization or following completion of the polymerization, in order to control the polymerization reaction and prevent deterioration of the product polymer.

EXAMPLES

As follows is a description of specifics of the present invention using a series of examples. However, the present invention is in no way limited to the examples presented.

Example 1

In a stainless steel polymerization vessel of internal capacity 130 $m^3$ with an external jacket, a cooling baffle provided inside the polymerization vessel, and a reflux condenser (RC) connected directly to the upper portion of the vessel, were placed 56.8 t of deionized water, 13.7 kg of a partially saponified polyvinyl alcohol with a saponification ratio of 80.5 mol %, 2.9 kg of a partially saponified polyvinyl alcohol with a saponification ratio of 50.0 mol %, and 5.6 kg of hydroxypropylmethyl cellulose with a methoxy substitution ratio of 28.5% by weight and a hydroxypropyloxy substitution ratio of 8.9% by weight. Subsequently, the inside of the polymerization vessel was degassed until the internal pressure reached 8.0 kPa (60 mmHg), and 46.3 t of vinyl chloride monomer was charged. With the mixture undergoing constant stirring, 22.5 kg of di-2-ethylhexyl peroxydicarbonate was added as a polymerization initiator, while the temperature was raised by passing hot water through the jacket and the baffle. Once the temperature inside the polymerization vessel reached 57.0° C., the polymerization was then allowed to proceed with the temperature maintained at this level.

During the period from the point where the polymerization conversion rate reached 15% until the point where the polymerization conversion rate reached 30%, the quantity of heat removed by the reflux condenser was increased to 7,000 MJ/hr, and a fixed rate operation was then conducted at this level until the polymerization conversion rate reached 65%.

Subsequently, during the period up until the point where the polymerization conversion rate reached 75%, the quantity of heat removed by the reflux condenser was reduced from 7,000 MJ/hr down to 5,000 MJ/hr, and a heat removal fixed rate operation was then conducted at this level until the pressure inside the polymerization vessel fell to 0.588 MPa (a polymerization conversion rate of 90%), and then finally, 44.7 kg of a 30% aqueous dispersion of triethylene glycol-bis[3-(3-t-butyl-5-methyl-4-hydroxyphenyl)propionate] was added to the polymerization vessel, and any unreacted monomer was recovered.

Following the addition of 17.9 kg of 25% ammonia water to the thus obtained polymer slurry to adjust the pH, the polymer slurry was dewatered and dried, yielding a vinyl chloride-based polymer. Following completion of the polymerization, the inside of the reflux condenser was inspected visually for any evidence of vinyl chloride monomer eruptions up inside the condenser.

During the raising of the temperature within the polymerization vessel, hot water at 80° C., the temperature of which had been adjusted using a heat exchanger, was passed through the jacket and the cooling baffle, and once the temperature inside the polymerization vessel had reached the set polymerization temperature (57.0° C.), cold water at 10° C., the temperature of which had been adjusted using a refrigeration device, was passed through the jacket and the cooling baffle. Each of the lines was branched and rejoined at a point close to the jacket and the baffle, and were provided separately from the coolant line for the reflux condenser. Heat removal control was conducted by adjusting the flow rates of cold water and hot water in each line using an automatic valve, thereby maintaining the temperature inside the polymerization vessel at a constant temperature.

Furthermore, the respective heat removal quantities were calculated using the value obtained by multiplying the temperature difference of the cold water between entry into, and exit from the line, and the flow rate of the cold water, and the load factor on the refrigeration device used for adjusting the temperature of the cold water was calculated using the value obtained by dividing the power consumption of the refrigeration device by the rated output.

The heat removal pattern described above is shown in Table 1. Furthermore the polymerization results, including the particle size distribution of the product polymer (#60 pass %, #100 pass %, #200 pass %), the bulk specific gravity, the plasticizer absorption quantity, the quantity of fish eyes, the level of eruption inside the reflux condenser, and the refrigeration device load factor are all shown in Table 3.

Example 2 and Comparative Examples 1 to 4

With the exceptions of performing the polymerization in accordance with the heat removal patterns shown in Table 1 and Table 2, polymerization reactions were conducted in the same manner as the example 1. In the same manner as the example 1, the polymerization results, including the particle size distribution of the product polymer, are shown in Table 3 and Table 4.

The methods used for evaluating and measuring the product polymers are described below.

[Particle Size Distribution]

This was measured in accordance with the particle size distribution measurement method of JIS Z-8801, thereby determining the % by weight of the sample which passed through #60, #100 and #200 size sieves.

[Bulk Specific Gravity]

This property was measured in accordance with JIS K-6721.

[Plasticizer Absorption Quantity]

Glass fiber was placed in the bottom of an aluminum alloy vessel of internal diameter 25 mm and depth 85 mm, and a 10 g sample was then placed in the vessel. 15 ml of dioctyl phthalate (DOP) was then added, the vessel was left to stand for 30 minutes to allow the DOP sufficient time to penetrate into the sample, and excess DOP was then removed by centrifuging at an acceleration of 1,500 G. The weight of the sample was then measured, and the amount of DOP absorbed by the sample was determined as a weight % relative to the weight of the sample prior to absorption.

[Quantity of Fish Eyes]

100 parts by weight of the product polymer, 50 parts by weight of DOP, 0.1 parts by weight of barium stearate, 0.1 parts by weight of cadmium stearate, 0.8 parts by weight of cetanol, 2.0 parts by weight of a tin based stabilizer, 0.5 parts by weight of titanium dioxide, and 0.1 parts by weight of carbon black were kneaded together for 5 minutes using a six inch roller at a temperature of 140° C., and a sheet of thickness 0.3 mm was formed from the mixture. The number of white transparent spots per 100 $cm^2$ of the sheet was recorded as the fish eye quantity.

(In Table 1 and Table 2, the values recorded in the sections labeled "jacket+baffle heat removal quantity 1" and the like, refer to heat removal quantities at the polymerization conversion rate shown immediately therebelow.)

TABLE 1

|  | Example 1 | Example 2 |
| --- | --- | --- |
| RC first stage heat removal commenced | Polymerization conversion rate: 15% | Polymerization conversion rate: 20% |
| RC first stage fixed rate period | Polymerization conversion rate: 30 to 65% | Polymerization conversion rate: 35 to 65% |
| RC first stage heat removal quantity (A) | 7000 MJ/hr | 8500 MJ/hr |
| (Jacket + baffle heat removal quantity) 1 | 8500 MJ/hr | 7000 MJ/hr |
| polymerization conversion rate | 35% | 39% |
| RC heat removal ratio | 45% | 55% |
| RC second stage fixed rate period | Polymerization conversion rate: 75 to 90% | Polymerization conversion rate: 75 to 90% |
| RC second stage heat removal quantity (B) | 5000 MJ/hr | 5000 MJ/hr |
| (Jacket + baffle heat removal quantity) 2 | 14000 MJ/hr | 13800 MJ/hr |
| polymerization conversion rate | 80% | 80% |
| RC heat removal ratio | 26% | 27% |
| RC heat removal quantities ratio (A/B) | 1.40 | 1.70 |

TABLE 2

|  | Comparative Example 1 | Comparative Example 2 | Comparative Example 3 | Comparative Example 4 |
| --- | --- | --- | --- | --- |
| RC first stage heat removal commenced | Polymerization conversion rate 15% | Polymerization conversion rate 0% | Polymerization conversion rate 15% | Polymerization conversion rate 15% |
| RC first stage fixed rate period | Polymerization conversion rate 30% onwards | Polymerization conversion rate 15 to 65% | Polymerization conversion rate 30 to 65% | Polymerization conversion rate 30 to 65% |
| RC first stage heat removal quantity (A) | 5000 MJ/hr | 7000 MJ/hr | 7000 MJ/hr | 12000 MJ/hr |
| (Jacket + baffle heat removal quantity) 1 | 10500 MJ/hr | 8500 MJ/hr | 8500 MJ/hr | 3500 MJ/hr |
| polymerization conversion rate | 35% | 42% | 35% | 35% |
| RC heat removal ratio | 32% | 45% | 45% | 77% |
| RC second stage fixed rate period | — | Polymerization conversion rate 75 to 90% | Polymerization conversion rate 75 to 90% | Polymerization conversion rate 75 to 90% |
| RC second stage heat removal quantity (B) | 5000 MJ/hr | 5000 MJ/hr | 6000 MJ/hr | 5000 MJ/hr |
| (Jacket + baffle heat removal quantity) 2 | 14000 MJ/hr | 12000 MJ/hr | 13000 MJ/hr | 12000 MJ/hr |
| polymerization conversion rate | 80% | 80% | 80% | 80% |
| RC heat removal ratio | 26% | 29% | 32% | 29% |
| RC heat removal quantities ratio (A/B) | 1.00 | 1.40 | 1.17 | 2.40 |

TABLE 3

|  | Example 1 | Example 2 |
| --- | --- | --- |
| Particle size distribution |  |  |
| #60 pass(%) | 100 | 100 |
| #100 pass (%) | 27.8 | 28.5 |
| #200 pass (%) | 0.2 | 0.3 |
| Bulk specific gravity (g/ml) | 0.549 | 0.551 |
| Plasticizer absorption quantity (%) | 23.2 | 23.5 |
| Fish eye quantity (numbers) | 15 | 20 |
| Evidence of eruption | no | no |
| Refrigeration device load factor (%) | 65 | 53 |

TABLE 4

|  | Comparative Example 1 | Comparative Example 2 | Comparative Example 3 | Comparative Example 4 |
|---|---|---|---|---|
| Particle size distribution |  |  |  |  |
| #60 pass (%) | 100 | 90.2 | 100 | 86.5 |
| #100 pass (%) | 23.3 | 15.0 | 17.0 | 11.3 |
| #200 pass (%) | 0 | 2.0 | 0 | 3.5 |
| Bulk specific gravity (g/ml) | 0.541 | 0.530 | 0.538 | 0.529 |
| Plasticizer absorption quantity (%) | 23.0 | 24.8 | 22.8 | 25.1 |
| Fish eye quantity (numbers) | 25 | 60 | 1200 | 75 |
| Evidence of eruption | no | no | yes | no* |
| Refrigeration device load factor (%) | 90 | 57 | 35 | 23 |

*Scale was evident up to the upper portions exposed to the gas-phase at the time of polymerization, of internal wall surfaces of the polymerization vessel.

According to a method of the present invention, when vinyl chloride or vinyl chloride and another copolymerizable monomer are polymerized in an aqueous medium inside a polymerization vessel equipped with a reflux condenser, producing a vinyl chloride-based polymer, the load on the refrigeration device required for heat removal can be reduced, and yet the vinyl chloride-based polymer can be produced with a good level of quality stability.

What is claimed is:

1. A method of producing a vinyl chloride-based polymer by suspension polymerization of vinyl chloride or a monomer mixture comprised of vinyl chloride using a polymerization vessel equipped with a reflux condenser and a jacket, in which a total quantity of heat removed per unit of time is at least 10,000 MJ/hr, said method comprising:

(1) commencing heat removal when or after a polymerization conversion rate reaches 15%, (2) controlling said reflux condenser so as to remove a fixed quantity of heat per unit of time during a period from a point where said polymerization conversion rate reaches a preset polymerization conversion rate within a range from 20 to 35%, until a point where said polymerization conversion rate reaches another preset polymerization conversion rate within a range from 50 to 65%, wherein a ratio of a quantity of heat removed by said reflux condenser (A MJ/hr) relative to a total quantity of heat removed, per unit of time, is within a range from 30 to 60%, and (3) controlling said reflux condenser so as to remove a fixed quantity of heat per unit of time during a period from a point where said polymerization conversion rate reaches a preset polymerization conversion rate within a range from 70 to 75%, until a point where said polymerization conversion rate reaches another preset polymerization conversion rate of at least 80%, wherein a ratio of a quantity of heat removed by said reflux condenser (B MJ/hr) relative to a total quantity of heat removed, per unit of time, is within a range from 20 to 30%, wherein a ratio of said quantity of heat removed (A MJ/hr)/said quantity of heat removed (B MJ/hr) is in a range from 1.2 to 2.0.

2. The method according to claim 1, wherein said polymerization vessel is further equipped with baffles.

3. The method according to claim 1, wherein said polymerization vessel is further equipped with a cooling coil.

4. The method according to claim 1, wherein at the step (1), said heat removal is commenced at a point where a polymerization conversion rate is 15%.

5. The method according to claim 1, wherein at the step (1), said heat removal is commenced at a point where a polymerization conversion rate is 20%.

6. The method according to claim 1, wherein at the step (2), during a period from a point where said polymerization conversion rate is 30%, until a point where said polymerization conversion rate is 65%, said reflux condenser is controlled so as to remove a fixed quantity of heat per unit of time.

7. The method according to claim 1, wherein at the step (3), during a period from a point where said polymerization conversion rate is 75%, until a point where said polymerization conversion rate is 90%, said reflux condenser is controlled so as to remove a fixed quantity of heat per unit of time.

8. The method according to claim 1, wherein said monomer mixture comprised of vinyl chloride is suspension polymerized, and said monomer mixture contains at least 50% by weight of vinyl chloride therein.

9. The method according to claim 1, wherein said monomer mixture further comprises at least one other monomer copolymerizable with vinyl chloride.

10. The method according to claim 9, wherein said monomer copolymerizable with vinyl chloride is at least one compound selected from the group consisting of vinyl esters, acrylate esters, methacrylate esters, olefins, maleic anhydride, acrylonitrile, styrene and vinylidene chloride.

11. The method according to claim 9, wherein said monomer copolymerizable with vinyl chloride is selected from the group consisting of vinyl acetate, vinyl propionate, methyl acrylate, ethyl acrylate, ethylene, propylene, maleic anhydride, acrylonitrile, styrene, and vinylidene chloride.

* * * * *